Patented Oct. 9, 1934

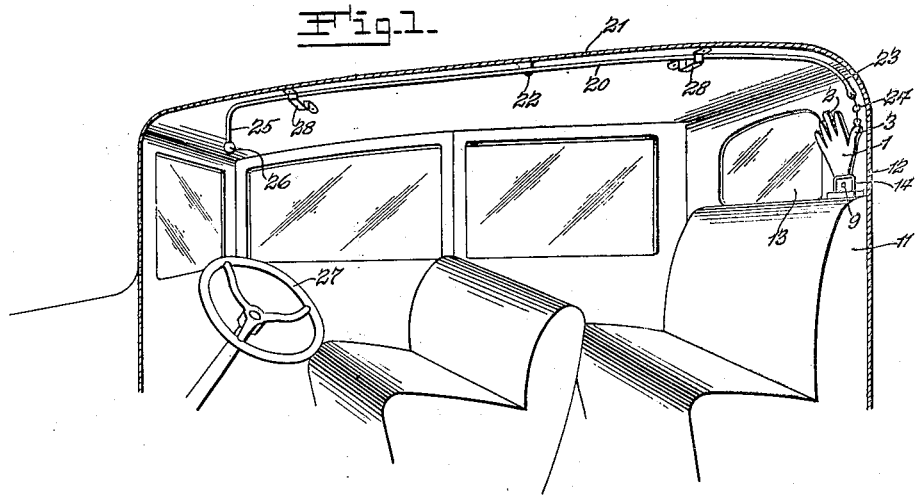

1,975,765

UNITED STATES PATENT OFFICE 1,975,765

SIGNAL DEVICE FOR VEHICLES

William F. Brennan, Collinsville, Ill.

Application February 12, 1934, Serial No. 710,775

3 Claims. (Cl. 116—51)

This invention relates to signal devices for vehicles.

Objects of the invention are to provide a signal device adapted to be mounted in or on a vehicle in a position in which the signal device in its unoperated position is concealed from persons beyond the vehicle toward the rear; to provide connections whereby the driver of the vehicle may conveniently move the signal device from its unoperated position to a position in which the signal device is plainly visible beyond the rear of the vehicle; and to provide means whereby the signal device is illuminated automatically and as an incident to the movement thereof to operated position and whereby the light is extinguished when the signal device is moved to its unoperated position.

Another object of the invention is to provide an improved signal device of the character indicated which may be conveniently mounted in connection with any of the usual types of motor vehicles as an accessory or addition, so that the driver of the vehicle may give a signal that he is about to stop or to make a turn and may conveniently give said signal without the necessity of opening the window in the door at the side of the driver to extend his hand in the customary manner.

Other objects will appear from the following description, reference being made to the annexed drawing, in which—

Fig. 1 is a view illustrating a satisfactory manner in which the signal device may be mounted in an automobile.

Fig. 2 is a view showing the signal device in its operated position and visible through the rear glass panel of the automobile.

Fig. 3 is an enlarged view, with parts in section, illustrating the construction of the signal device and the means whereby it is illuminated when moved from unoperated to operated position.

Fig. 4 is a vertical sectional view approximately on the line 4—4 of Fig. 3.

The improved signal device may be of any desired form or shape, that shown having the general form of a hand and including a lower portion 1 representing the palm of the hand and having upwardly extended projections 2 representing the fingers and an upwardly and laterally extended projection 3 representing the thumb. The casing, comprising the parts 1, 2 and 3, is preferably of metal to which is attached a translucent or transparent panel 4 of glass, or other appropriate material. In the lower portion of the housing thus provided, an electric lamp socket 5 is attached and an electric lamp 6 is mounted in said socket in the usual way. A circuit member 7 is supported by the lower portion of the signal device and is in electrical communication with the filament of the lamp while the cooperating circuit member 8 is in circuit with the metallic socket 5.

This signal device is mounted on a pivot 9 supported by a bracket 10 that may be attached to the rear portion 11 of an automobile in front of the opaque or non-transparent portion 12, so that when the signal device is in its upwardly extended and unoperated position, it is concealed and is invisible to those beyond the rear of the vehicle. Thus, the part 12 of the vehicle body is an element for concealing the signal device in its unoperated position. When the signal device is swung laterally to its operated position, it extends in front of the transparent rear panel 13 of the automobile and is plainly visible from the rear.

In its swinging movements, the signal device is guided and strengthened by a guiding member 14 attached to the bracket 10. Contact members 15 and 16 are attached to the bracket 10 in position to be engaged by the circuit members 7 and 8, respectively, when the signal device is in its operated position and extends laterally in front of the transparent rear window or panel 13. Wires 17 and 18 lead from the contact members 15 and 16, respectively, to a source of electrical energy 19. Thus, when the signal device is in its operated position the filament of the lamp 6 is in a closed circuit and the lamp is lighted. And, when the signal device is in its unoperated and concealed position, the circuit members 7 and 8 are out of contact with the contact members 15 and 16, thereby keeping the electric circuit open and the lamp unlighted.

A rod 20, bent to conform generally to the curvature of the top 21 of the autmobile body, is supported by a vertical pivot 22 attached to the top 21, so that said rod may be oscillated or swung in a plane approximately parallel with the automobile top. The rod 20 is provided with a downwardly extended portion 23 at its rear end having a flexible connection 24 with the thumb projection 3 of the signal device. The front end of the rod 20 is provided with a downwardly extended portion 25 having thereon a handle 26 above the steering wheel 27 and in position to be conveniently engaged and operated by one hand of the driver of the vehicle. Guide brackets 28 are attached to the vehicle top 21, both toward the front and toward the rear from the pivot 22, and support and guide the rod 20 in its swinging movements.

From the foregoing, it is apparent that this invention may be manufactured and mounted in connection with an automobile at comparatively low cost and constitutes a very convenient means for signalling to the drivers of other vehicles approaching from the rear in the dark and also enables the driver to give a proper signal without the necessity of opening the door or window. The construction and arrangement of the device may be varied within the scope of equivalent limits without departure from the nature and principle of the invention.

I claim:

1. In an automobile having a body provided with a window at the rear, a member pivotally mounted within the rear portion of the body laterally from said window, a rod pivotally supported in connection with the top of the vehicle body and having its rear end connected with said member, guides supporting said rod for lateral swinging movements, a downwardly extended portion in connection with the forward end of said rod, and a handle in connection with said downwardly extended portion for operating said rod to move said member to and from position in front of said window.

2. In a motor vehicle, a member pivotally supported for lateral swinging movements at the rear of the vehicle, a rod having its rear end connected with said member and having its forward end near the front of the vehicle, a pivot supporting said rod for lateral swinging movements, and a handle in connection with the forward end of said rod for swinging the same laterally to move said member to and from position in front of said window.

3. In a motor vehicle, a member supported near the rear of the vehicle for lateral swinging movements, a rod having its rear end connected with said member and its forward end adjacent to the steering wheel of the vehicle, a pivot supporting said rod at the top of the vehicle, and a handle in connection with the forward end of said rod for operating the same to move said member to and from position in which said member is visible from beyond the rear of the vehicle.

WILLIAM F. BRENNAN.